United States Patent [19]

Harvey

[11] Patent Number: 5,024,111

[45] Date of Patent: Jun. 18, 1991

[54] ADJUSTMENT OF ZERO SPRING RATE SUSPENSIONS

[75] Inventor: Thomas J. Harvey, Lompoc, Calif.

[73] Assignee: AEC-Able Engineering Co., Inc., Goleta, Calif.

[21] Appl. No.: 428,395

[22] Filed: Oct. 30, 1989

[51] Int. Cl.⁵ ............................................. F16M 13/00
[52] U.S. Cl. .................................... 73/865.6; 248/550; 248/610; 267/150
[58] Field of Search ............... 248/550, 560, 610, 327, 248/59; 267/150; 73/865.6

[56] References Cited

U.S. PATENT DOCUMENTS

| | | | |
|---|---|---|---|
| 2,335,834 | 11/1943 | Wood | 248/59 |
| 2,372,214 | 3/1945 | Loepsinger | 248/59 |
| 2,945,656 | 7/1960 | Sherburne | 248/610 |
| 4,023,756 | 5/1977 | Baker | 248/59 |
| 4,344,596 | 8/1982 | Hjaeresen | 248/550 |
| 4,682,752 | 7/1987 | Pischzik | 248/550 |
| 4,860,600 | 8/1989 | Schumacher | 73/865.6 |

Primary Examiner—David L. Talbott
Assistant Examiner—Robert A. Olson
Attorney, Agent, or Firm—Donald D. Mon

[57] ABSTRACT

An adjustment system for a suspension system having the property of providing a zero spring rate response to limited vertical excursions from a reference level, the suspension system including a load suspension spring supported from a load spring anchor. The adjustment system includes a rigid reference element below the suspension spring, bi-directional drive means between the load spring and the load spring anchor, and a probe insertable into an aperture in the reference element. Circuit means are responsive to the location of the probe relative to the reference element, to adjust the elevation of the load spring relative to the reference level and thereby to tend to restore the reference element to the reference level.

5 Claims, 5 Drawing Sheets

ADJUSTMENT OF ZERO SPRING RATE SUSPENSIONS

FIELD OF THE INVENTION

This invention relates to spring suspension systems which can exhibit zero spring rate response, and in particular to a device to adjust the system to a configuration which will provide this property.

BACKGROUND OF THE INVENTION

The dynamic testing of bodies intended for use in a non-gravitational environment is greatly complicated by the fact that the testing must be accomplished on earth where there is a gravitational field. Unfortunate experiences have shown that dynamic responses in space can differ greatly from those which are encountered on earth. Still, space is not the place to conduct interim dynamic testing of basic structures. It is far too expensive and is likely to provide only a single test which might not provide the necessary information. Instead what is required is a support structure which within sensible limitations of dynamic and dimensional ranges, and cost, can provide support for a body under test which will be the equivalent of the body's response to forces exerted outside of a gravitational field.

Evidently the body under test must be physically supported, and it will be, by means of a spring suspension. However, this suspension is so constructed and arranged that, while still supporting the body, it exhibits a zero spring rate response to limited movements of the body. This characteristic provides behavior of the total system such that an absence of gravitational forces is simulated.

The zero rate response is well-known in the fields in which it is of interest, and there are at least several basic schemes for attaining this result. The inventor herein does not claim to be the inventor of any zero rate system, including the one described herein.

The problem with all of these systems is that the range of movement within which the zero rate effect exists is quite short. The inventor herein has been able to extend this range to a total movement of about 2.0 inches. Accordingly, to take advantage of this property of the system, it is important that, under the intended test load, the suspension be adjusted so the system is in a central datum position, preferably within a few thousandths of an inch of its very center.

These systems are expected to carry substantial loads. An installation with perhaps 30 of these suspensions, each supporting 100 to 750 pounds of weight, is well within the expected parameters of such installations.

Because there is zero spring rate at the datum position, the support condition can gently and very slowly drift. For this reason, adjustment is a slow and painstaking process which requires hours, and sometimes even days. At least to applicant's knowledge there does not exist any automatic and reliable means to accomplish this painstaking process.

It is an object of this invention to provide adjustment means for a zero spring rate system which is automatic in the sense of providing means to hunt for a center adjustment. Clearly the adjustment system itself cannot involve a springing response, or the system would have no tendency to stop. This invention intends to provide an adjustment means devoid of springing response.

BRIEF DESCRIPTION OF THE INVENTION

An adjustment system according to this invention is used in combination with a zero spring rate suspension system. The suspension system includes a load spring which suspends the body to be tested. The extension of the load spring is in accordance with Hooke's Law, and is generally proportional to the weight supported because of its inherent property of spring rate (spring constant). It is important to observe that this extension must and does occur. This system does not render the body weightless. Instead, within a given and very limited amplitude range, it will exhibit the property of zero spring rate response to vibrational and other forces exerted on the body under test. The zero rate system includes a response spring which in combination with the load spring produces the zero rate response.

It is further evident that because of the extension of the supported load, any datum point in the spring system in which zero rate response is to be expected must relate not only to the suspended weight, but also to the relative location of the reference level of the centered position at which the appropriate response is to be exerted.

Further, especially when the suspended weight is part of a very large body, such as a scale model of a space vehicle, the suspending system must be located with reference to the geometry of the test body. The suspension system and the zero rate provisions must themselves be spatially adaptable, and finally mutually adjustable to provide the appropriate zero rate response.

According to this invention, the response spring system has a null position where it is ineffective on the support of the load. When a datum point on the load spring system at equilibrium is coincident with the null position, the zero rate system will also be in full equilibrium. When the load is varied, such as by vibrational forces exerted on the suspended body, the load spring system will be expected to respond to what it perceives to be an increase or reduction in the suspended weight, and its response will involve the spring rate of the load spring. The response spring system will then intervene, for the purpose of eliminating the influence of spring rate, and this is effective within a short range of amplitudes. This invention is not involved in this response. After the system is initially adjusted, the adjustment system is passive. In fact, it is withdrawn from the active system. Its sole function is, before dynamic operation, to adjust the relative positions of the datum point on the load spring system to the null position of the response spring system, so the zero rate system where the test starts is within its zero rate range.

According to a preferred but optional feature of the invention, a reference element is included in the suspension system depending from the load spring. The spring itself is above it, and the load is below it, so that its elevation relative to an upper anchored end of the load spring is a function of the weight of the suspended load.

A response spring system has a reference level at which it does not exert a prevailing force along the upright Y axis of the suspension system. The response system has an anchor supporting an anchored end at this reference level.

Motor means is provided to move one or the other of the anchored ends vertically so as to bring the reference level and the reference element into coincidence. A probe is movable along the reference axis into and out of the path of the reference element. The probe is withdrawn during system operation. It is inserted as part of the adjustment procedures.

In the illustrated preferred embodiment the probe has an upper and a lower arm with rigid contacts which make contact with the reference element at the extremes of upper and lower zero effect movement of the reference element, which of course are the limits of this effect for the system. When contact is made between the contact and the reference element, the motive means is caused to operate, to cause one of said anchored ends to move relative to the other so as to tend to restore the coincidence of the center of the reference element and the reference level. After a few cycles of this type, the system will generally be in sufficient equilibrium that the probe can be withdrawn and the testing cycle can begin.

According to a preferred but optional feature of this invention, the probe includes a load bar which remains in the path of the reference element, but does not impede its normal operation. It will, however, restrain the system against excessive amplitude movements which can occur when the amplitude of the load spring goes beyond the zero range. It is also of assistance while making an initial setting of the system.

The above and other features of this invention will be fully understood from the following detailed description and the accompanying drawings, in which:

DETAILED DESCRIPTION OF THE INVENTION

Figure 1:
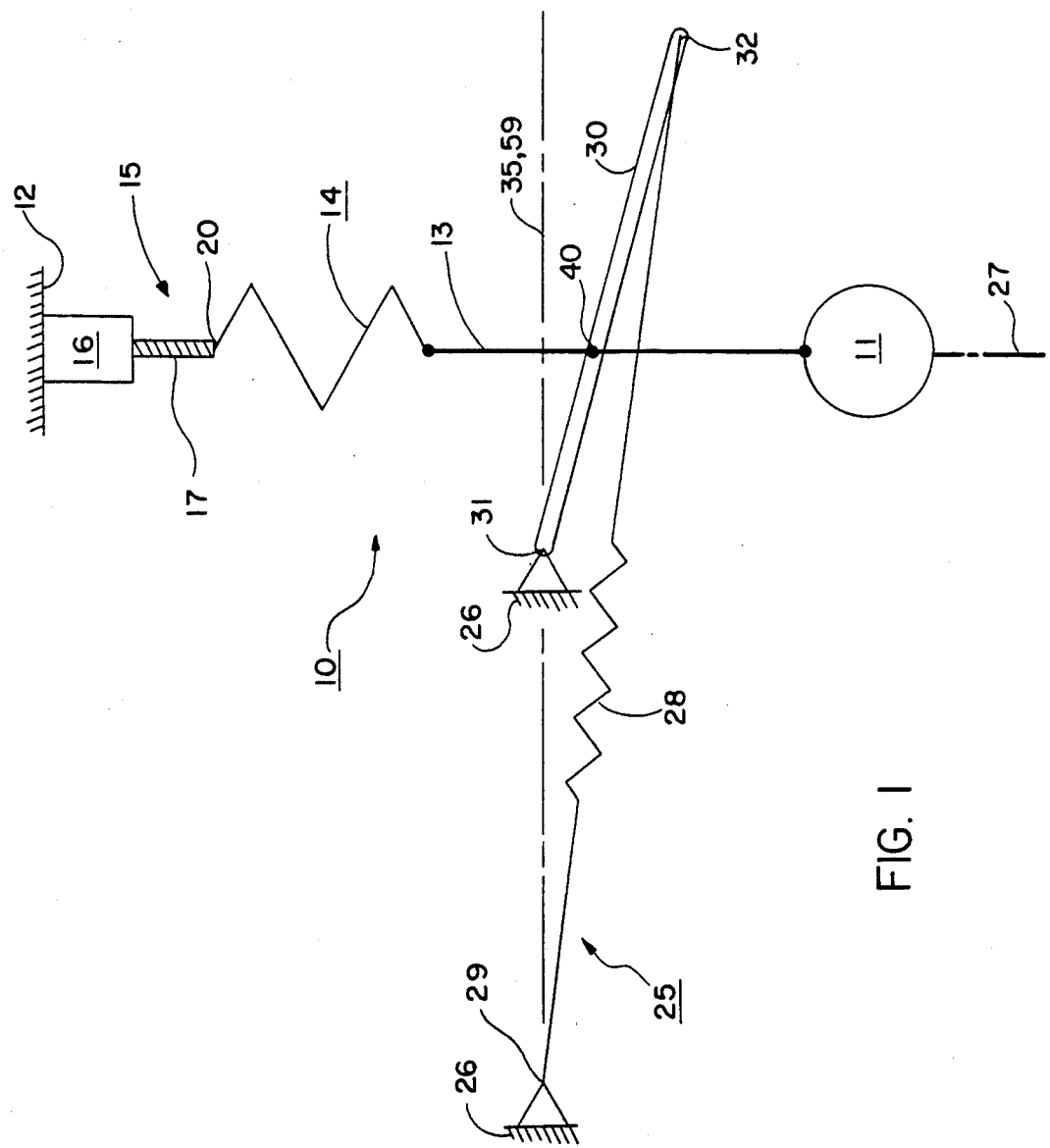
FIG. 1 is a schematic illustration of a zero rate spring suspension system with which this invention is useful.

FIG. 1 shows an example of a zero rate response support system 10 useful with the invention. Its objective is to support a load 11 from supporting structure 12 (sometimes called a "load spring anchor"). This may be such as a stanchion or a framework (an "anchor") supported from ceiling structure. Also, it could be a part of a frame which itself is supported by a stanchion or by other structure.

In any event the load is connected to a cable 13 or other tension-type element, which in turn is connected to the lower end of a load spring 14. The upper end (the "anchored end") of the load spring is connected to adjustment means 15, preferably comprising a rotary electric motor 16 which bi-directionally drives a lead screw 17. The motor is fixed to the load spring anchor (structure 12).

Rotation of the motor in one direction will raise the upper, anchored, end 20 of the load spring. Rotation in the other direction will lower the upper end of the load spring. Thus it is apparent that when a load is suspended by the load spring, operation of the motor will raise or lower the load without changing the extended length of the load spring. It is to be kept in mind that the load is freely suspended.

A response system 25 has a response system anchor 26 which is most conveniently mounted to the same structure as the load spring anchor. One of the anchors, usually the load spring anchor is vertically movable independently of the other anchor along the vertical (y) axis 27. A response spring 28 in the response system is an adjustable-tension spring, appropriately pre-loaded in tension, connected at one of its ends 29 (its "anchored end") to anchor 26.

A rigid response lever 30 is pivotally mounted to anchor 26 by a hinge 31. The hinge is spaced from end 29 of the response spring along the horizontal (x) axis.

The other end 32 of the response spring is connected to lever 30, spaced from the hinge. This arrangement provides a toggle-type lever system which is stable only when end 32 of the lever is on a line which also extends through end 29 of the spring and through hinge 31. The line through 29 and 31 is defined as the "reference level 35" and extends along the (X) axis. When the lever is on either side of this level, the response spring exerts a force to move it up or down by exertion of a component of force along the (y) axis, biased to do so by the response spring.

A reference element 40 is carried by cable 13, and is pivotally connected to the response lever at a location between the hinge and the point of attachment of the response spring to the response lever. Thus, up and down movement of the reference element (as the consequence of a varying load on the cable, for example), will cause the lever to move up and down.

In FIG. 1, the response system has been shown off of its centered, reference level condition for purposes of illustration. When the system is optimally adjusted for a given load, the end 32 of the response lever will be coincident with the reference level, because that will be the center of the zero spring rate response range. If the lever is a straight member it will be horizontal. The operation of the device as described will be recognized by persons skilled in the art and will not be further described here, because an understanding of this function is not necessary to an understanding of the invention.

It is obvious that when the system is loaded with loads of various weight, an initial gross adjustment of the vertical spacing between the upper end of the load spring and the reference level is useful but not necessary. Such devices as screws and the like could be used for this purpose. However, in most cases these will not be provided. Instead the system will gradually be brought into adjustment by this system even though it may take considerable time to do so. Ultimately, the purpose of this invention is to provide a very fine adjustment to place the suspension system in a carefully defined condition within the zero spring rate response range, and this can be accomplished for large bodies by the simultaneous operation of an adjustment system for each suspension.

This invention accomplishes this objective by controlling the operation of motor 16 so as to raise or lower the reference element with the load already applied. In the illustrated embodiments this is accomplished by raising or lowering the anchored end of the load spring. It should be kept in mind that this system is totally passive once the system is adjusted. It has no part in the actual test operations.

Figure 2:
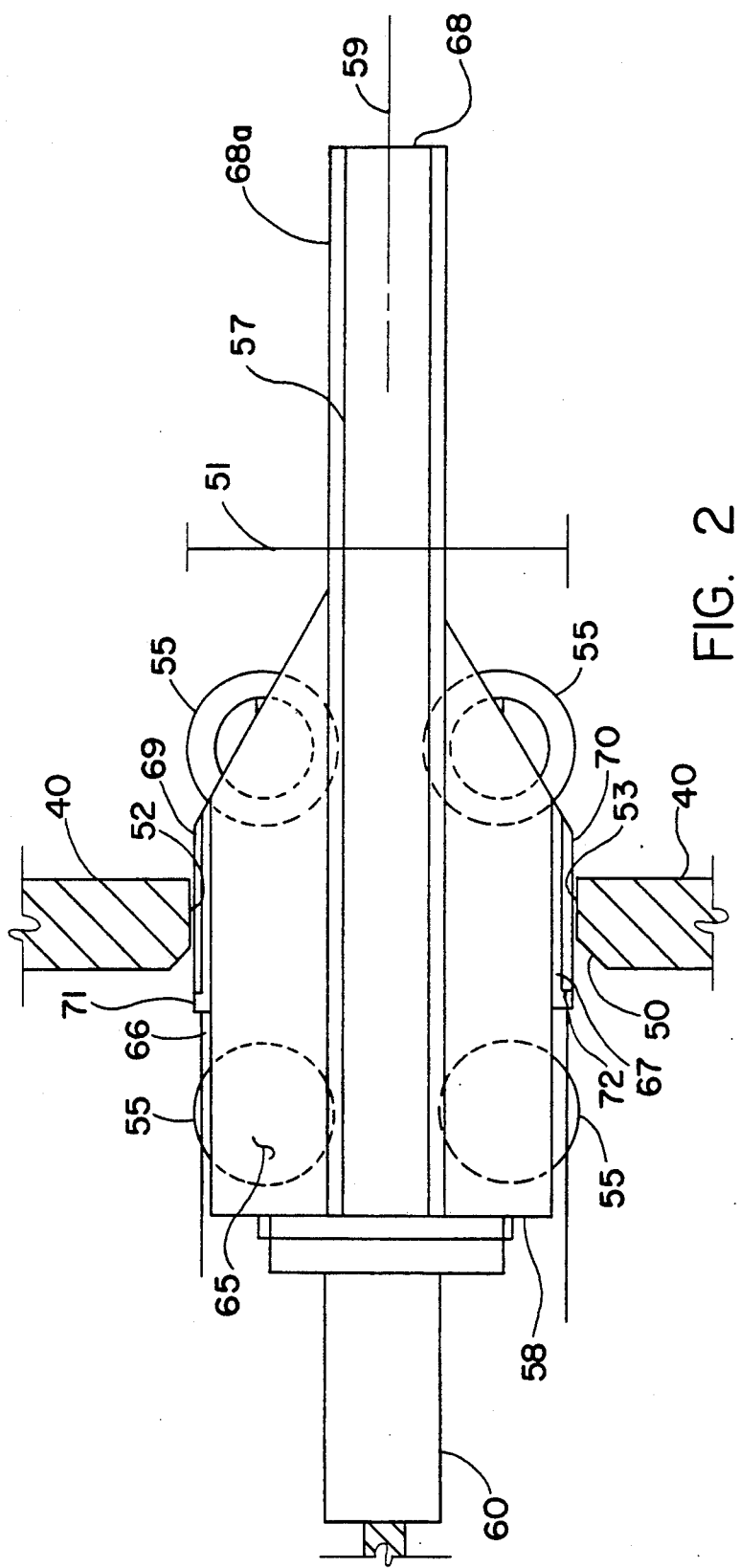
FIG. 2 is a side view, partly in axial cross-section, showing the adjustment system of this invention in use in the suspension system of FIG. 1.
Figure 3:
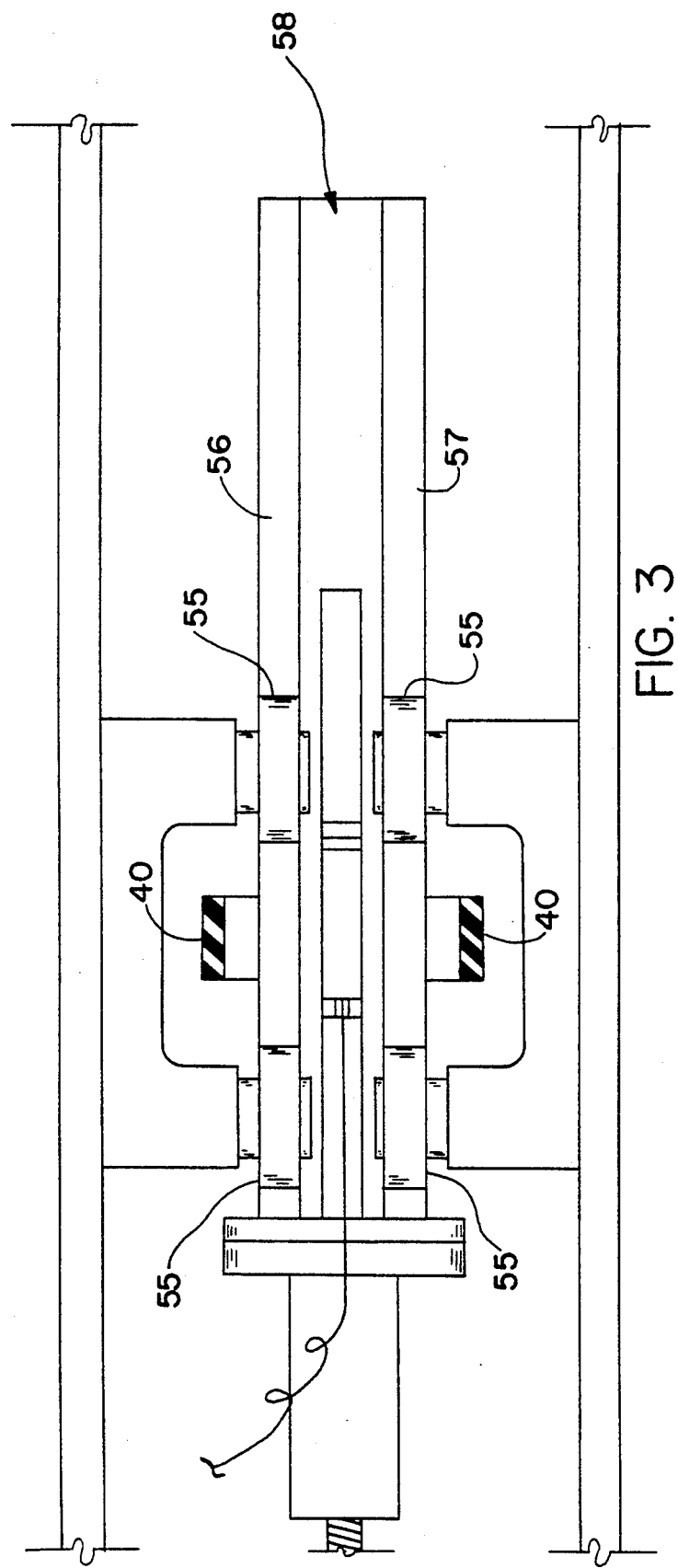
FIG. 3 is a top view of FIG. 2.
Figure 4:
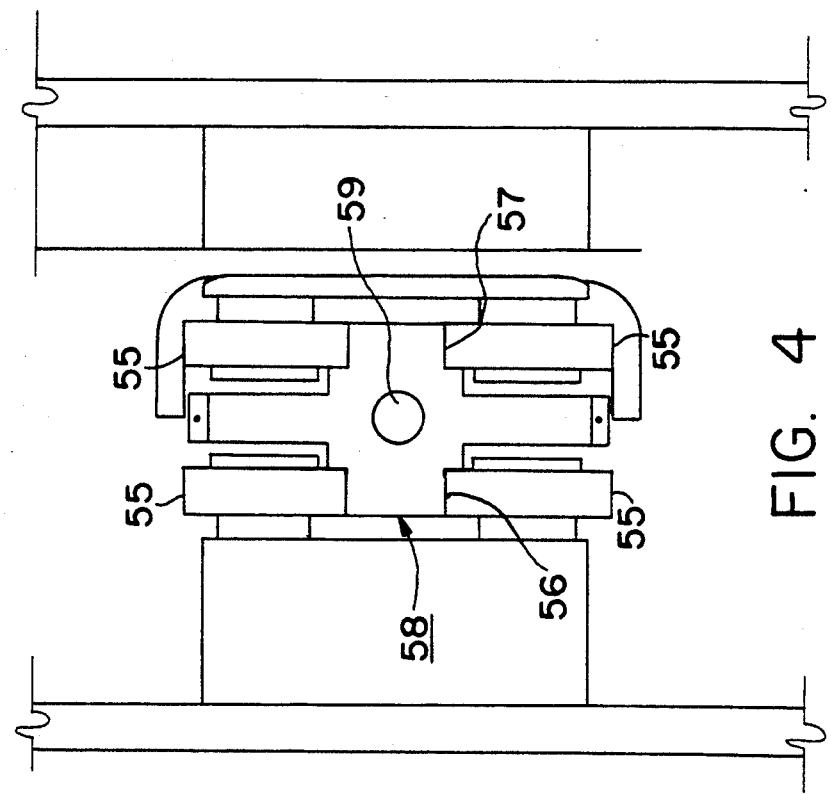
FIG. 4 is a side view of FIG. 2.

As best shown in FIGS. 2–4, the reference element 40 has an aperture 50 with a vertical dimension 51, an upper edge 52 and a lower edge 53. The length of the vertical dimension will be discussed below. It is shown formed as a part of the continuing support of the load, although it could if desired be formed separately from it and be attached to it.

The response system anchor or frame supports four guide wheels 55 which support rails 56,57 on opposite sides of probe 58. The rails form part of the response system anchor 26. The probe is centered on the reference level, and is movable laterally along horizontal X axis 59 (sometimes called a reference axis). A probe motor 60 is drivingly connected to the probe to move it bi-directionally along the horizontal axis.

The probe is a rigid body 65 having an upper edge 66 and a lower edge 67. These edges are preferably parallel. They reduce to a leading end 68 from which a load bar 68a projects.

The edges 66 and 67 carry contacts 69,70, which are electrically separated from the body by insulators 71,72. These are rigid, non-springing electrical contacts adapted to make surface-to-surface contact with respective edges of the reference element. The reference element provides an electrical ground. The contacts form respective parts of a circuit to control motor 16 shown in FIG. 5.

FIG. 2 shows the system in its ideally adjusted position. The vertical spacing between the edges of 52 and 53 (dimension 51) of the reference element is generally between about 0.004 and 0.006 inches greater than the spacing between contacts 69 and 70, and is evenly divided on both sides when the system is optimally adjusted. However massive this system is, this adjustment device is intended to make this class of very small adjustment in order to make maximum use of the very relatively small amplitude available in which zero spring rate response is provided. As can be seen, this is a very close adjustment of a suspension system which can support a significantly heavy load.

Figure 5:
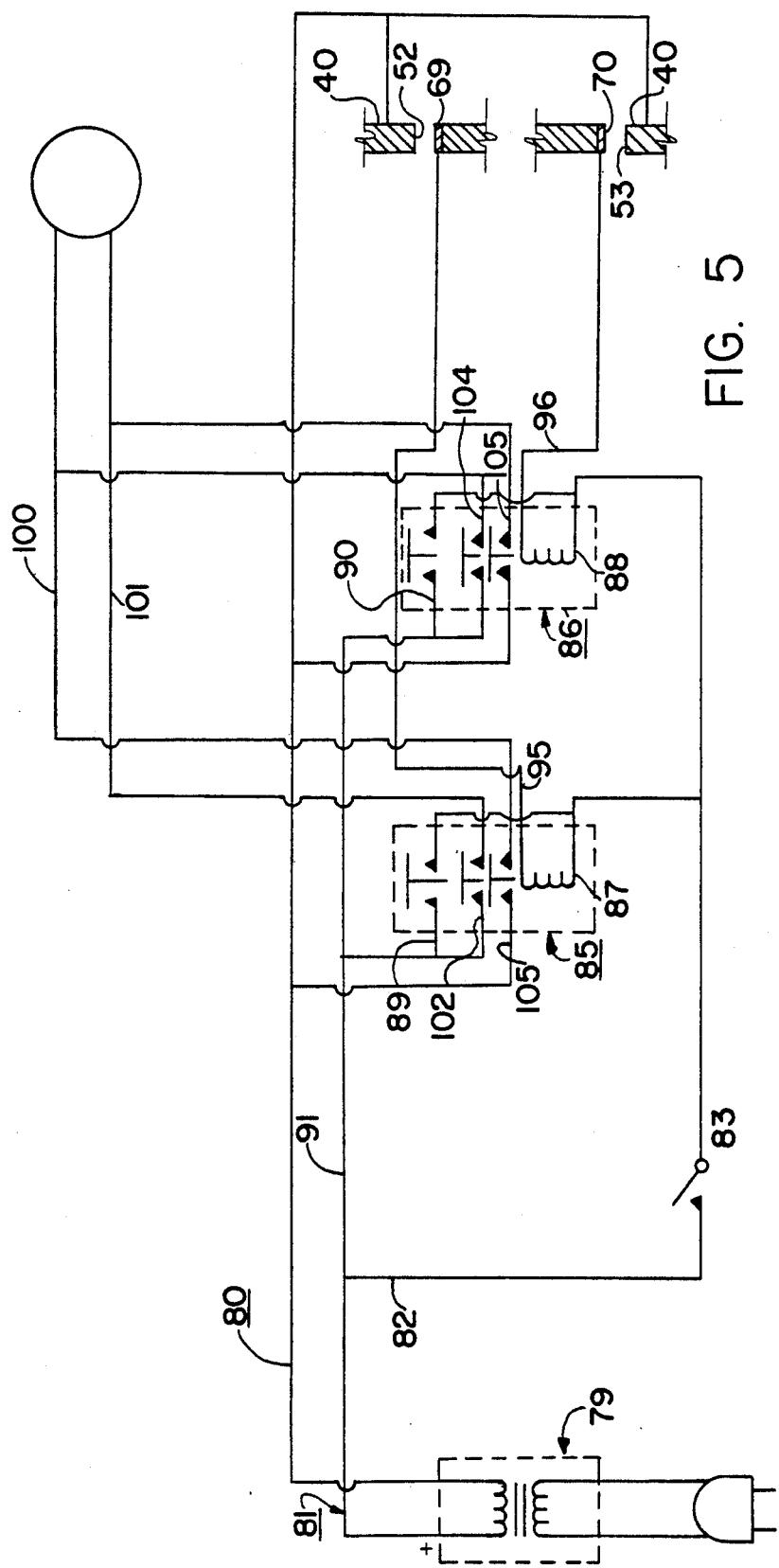
FIG. 5 is a diagram of an electrical control circuit useful with this invention.

FIG. 5 illustrates the upper and lower edges 52 and 53 of the reference element 40. The reference element is conductive at the edges, and as will be seen, these edges constitute a rigid conductive surface to be non-springingly contacted by respective probe contacts. When the suspension system is too low, lower contact 70 will contact lower edge 53. When the suspension system is too high (or rather the system condition as defined as the reference element's elevation relative to the reference level), upper contact 69 will contact upper edge 52. In either event, such contact will energize motor 16 to drive it and also drive lead screw 17 to move the anchored end of the load spring in the direction to move the center of the reference element toward the reference level. Such motor operation will continue for as long as the contact is made. It is not desired to give the system a heavy driving impulse, because it is better for the suspension system to drift into final adjustment, which is within a very narrow dimension range, only a few thousandths of an inch. For this reason the motor is heavily geared down, and the adjustment is very gradual.

A power supply 79, preferably 24 volts D.C., has a ground lead 80 which connects to the reference element, or more properly to both edges of it where contact will be made.

A hot lead 81 has a first branch 82 which incorporates a normally open start switch 83. Branch 82 further connects to a motor down relay 85 and to a motor up relay 86. Specifically it connects to solenoid coils 87 and 88, and to normally open latch switches 89, 90 of these relays.

Hot lead 81 has a second branch 91 which connects the opposite sides of the latch switches.

Leads 95, 96 connect respective solenoids to respective probe contacts 69 and 70. It will be seen that closure of the start switch will complete a circuit from ground lead 80 through any contact which makes contact with an edge, through the solenoid, to actuate the respective relay. Actuation of the relay, by closing the latch switch, will hold the system in operation until contact is broken at the respective reference edge, even after the start switch has re-opened. The start switch will always be spring-loaded open unless momentarily closed.

Motor 16 has two power leads 100, 101. The direction the motor will be driven is determined by which of these leads is connected to the hot lead. The other is of course connected to the ground lead.

Application of power and selection of direction of drive is accomplished by the relays. The relays have a pair of power switches 102, 103 and 104, 105. It will be observed that one side of all of these switches is connected to second branch 91 of the hot lead. The other sides of these normally-open switches are suitably connected to power leads 100 and 101.

The power switches and latch switch of each relay are ganged for simultaneous opening and closing under the control of the respective solenoid.

The circuit operation is straightforward. With the probe in place as shown in FIG. 2, and in its centered position, closure of the starting switch has no effect on the system. There is no completed circuit through a probe contact.

If, however, the system is sufficiently off center, then a contact will be made. Still nothing happens until the start switch is closed. When it is, a circuit will be completed through the solenoid of the respective power relay. This will close all of its switches. Then a circuit for the solenoid continues to be made through the latch switch even after the start switch is opened.

Power is supplied to the motor, and the load spring anchor is moved until contact is broken at the probe. This will drop out the coil and will break the circuit at all switches. If the system moves to contact the other side of the probe, the action will be in the reverse direction under control of the other relay if the start switch is closed again. Soon the system should be in equilibrium.

Then the probe will be withdrawn, and the suspension system can move without restraint by the probe. It is, however, convenient for the load bar to be left in place. It is thin enough not to reduce the useful amplitude, but strong enough to restrain the system from excessive movement or support the entire test load. It is optional.

The probe is moved by the probe member either manually or by the probe motor under control of a separate power circuit (not shown) which can drive the probe motor bi-directionally.

There are other suitable circuits for control of the system, so the illustrated system is given by way of example, and not of limitation. Similarly, there are other useful zero spring rate response systems, so the illustrated system is also given by way of example and not limitation.

This invention provides a useful means to adjust a zero spring rate suspension system within a very narrow range. The adjustment system is simple and rugged, and enables the suspension system to be optimally adjusted.

This invention is not to be limited by the embodiment shown in the drawings and described in the description which is given by way of example and not of limitation, but only in accordance with the scope of the appended claims.

I claim:

1. An adjustment system for a zero spring rate suspension system, said suspension system having the property of providing a zero spring rate response to limited vertical excursions from a reference level, said suspension system including a load suspension spring supported from a load spring anchor; said adjustment system comprising:

a rigid reference element below the suspension spring whose elevation is a function of load spring extension and elevation of the load spring;

bi-directional drive means interposed between said load spring and said load spring anchor to move the upper end of said load spring up or down along a vertical axis, said drive means including a bi-directional motor, said reference element including an aperture, said aperture having an upper and a lower edge;

a probe insertable into and removable from said aperture, said probe including an upper and a lower electrical contact, said contacts being so disposed and arranged as to make conductive contact with a respective edge when the reference element is sufficiently above or below a reference level, there being a vertical dimension between said edges, the vertical spacing between said probe contacts being smaller than said vertical dimension to permit limited excursion of said reference element from said reference level, said contacts and edges being rigid and non-springing; and circuit means responsive to contact of said probe contacts and edges to power said motor to adjust the elevation of the load spring relative to the reference level to move the contact away from the respective edge and thereby to tend to restore the reference element to the reference level.

2. Apparatus according to claim 1 in which said probe is mounted to fixed structure at said reference level, and in which tracks and rollers mounted to said structure and probe support the probe against vertical displacement and enable horizontal movement of the probe into and out of said aperture.

3. Apparatus according to claim 2 in which the probe carries at its end which is insertable into the aperture a load bar having a lesser vertical dimension than the spacing between the contacts, whereby when said probe is withdrawn from the aperture, the load bar may remain in the aperture to support the reference element against excessive vertical movement.

4. In combination: apparatus according to claim 1; and a response system aligned with a reference axis, said response system including a lever having a hinged end mounted to fixed structure at the reference level, and a free end, a response spring in tension between said structure and said free end, with one of its ends mounted to structure at said reference level, and its other end connected to said free end of said lever, and with the reference element connected to said lever between the said two ends of said lever.

5. Apparatus according to claim 1 in which said drive means further includes screw means driven by said motor to raise and lower said upper end of said suspension spring.

* * * * *